(12) United States Patent
Karki et al.

(10) Patent No.: US 11,895,942 B2
(45) Date of Patent: Feb. 13, 2024

(54) PLANT GROWTH PLATFORM

(71) Applicant: Earth Scout, GBC, Minneapolis, MN (US)

(72) Inventors: Dipesh Karki, Minneapolis, MN (US); Troy Schmidtke, Minneapolis, MN (US); Oleg Myslov, Minneapolis, MN (US); Subigya Shakya, Minneapolis, MN (US); Peder Lindberg, Fargo, ND (US); Mitra Sangroula, Minneapolis, MN (US); Christopher Burg, Minneapolis, MN (US); David Mulla, Minneapolis, MN (US); Michael Immer, Minneapolis, MN (US)

(73) Assignee: Earth Scout GBC, Mpls., MN (US)

( * ) Notice: Subject to any disclaimer, the term of this patent is extended or adjusted under 35 U.S.C. 154(b) by 283 days.

(21) Appl. No.: 17/197,793

(22) Filed: Mar. 10, 2021

(65) Prior Publication Data

US 2022/0287227 A1 Sep. 15, 2022

(51) Int. Cl.
*A01C 21/00* (2006.01)
*G06Q 50/02* (2012.01)
*A01B 79/00* (2006.01)

(52) U.S. Cl.
CPC .......... *A01C 21/007* (2013.01); *A01B 79/005* (2013.01); *G06Q 50/02* (2013.01)

(58) Field of Classification Search
CPC ..... A01C 21/007; A01B 79/005; G06Q 50/02
See application file for complete search history.

(56) References Cited

U.S. PATENT DOCUMENTS

| | | |
|---|---|---|
| 7,617,057 B2 | 11/2009 | May et al. |
| 8,924,101 B1 | 12/2014 | Schiltz et al. |
| 9,107,354 B2 | 8/2015 | Martin et al. |
| 9,354,235 B2 | 5/2016 | Roberts et al. |
| 9,563,848 B1 | 2/2017 | Hunt |
| 9,894,852 B2 | 2/2018 | Gilbert et al. |
| 10,007,640 B2 | 6/2018 | Maidl |
| 10,015,938 B1 | 7/2018 | Malsam et al. |
| 10,175,218 B2 | 1/2019 | Visser |
| 10,192,185 B2 | 1/2019 | Tomii et al. |
| 10,241,097 B2 | 3/2019 | Miresmailli et al. |
| 10,275,731 B2 | 4/2019 | Hunt |
| 10,296,005 B2 | 5/2019 | Cantrell et al. |
| 10,319,050 B2 | 6/2019 | Richt |
| 10,386,296 B1 | 8/2019 | Wolf |
| 10,387,977 B2 | 8/2019 | Avey et al. |
| 10,440,896 B2 | 10/2019 | Skinner |
| 2002/0167587 A1 | 11/2002 | Ogasawara |

(Continued)

FOREIGN PATENT DOCUMENTS

GB 2562275 A 11/2018

*Primary Examiner* — Tejal Gami
(74) *Attorney, Agent, or Firm* — Dietz Law Office LLC (57) ABSTRACT

A method for continuous real time monitoring of a crop growth including the use of a telescoping sensor mount capable of systematically extending a sensor above a crop growth canopy. The method includes determining a value associated with soil saturation, soil nitrogen mineralization, and growing degree units. These values are made available to the user real time. The telescoping sensor mount of the invention includes a foldaway tripod support system and is further capable of being powered with solar energy.

20 Claims, 10 Drawing Sheets (56) References Cited

U.S. PATENT DOCUMENTS

| | | |
|---|---|---|
| 2012/0109387 A1 | 5/2012 | Martin et al. |
| 2012/0123817 A1 | 5/2012 | Hohenberger et al. |
| 2013/0308675 A1 | 11/2013 | Sneed et al. |
| 2014/0222374 A1 | 8/2014 | Lock et al. |
| 2015/0272017 A1 | 10/2015 | Hedley et al. |
| 2016/0157446 A1 | 6/2016 | Bentwich |
| 2016/0309646 A1 | 10/2016 | Starr et al. |
| 2017/0217847 A1 | 8/2017 | Gerecke et al. |
| 2017/0270446 A1 | 9/2017 | Starr et al. |
| 2017/0286574 A1 | 10/2017 | Chappell |
| 2017/0295415 A1 | 10/2017 | Oezdemir et al. |
| 2018/0014452 A1 | 1/2018 | Starr |
| 2018/0014486 A1 | 1/2018 | Creechley et al. |
| 2018/0020622 A1 | 1/2018 | Richt |
| 2018/0146631 A1 | 5/2018 | Haran et al. |
| 2018/0209949 A1 | 7/2018 | Schriver et al. |
| 2018/0267008 A1 | 9/2018 | Sutton |
| 2019/0050948 A1* | 2/2019 | Perry .................. A01B 79/005 |
| 2019/0059203 A1 | 2/2019 | Staples et al. |
| 2019/0133058 A1 | 5/2019 | Larue |
| 2019/0233345 A1 | 8/2019 | Avgousti et al. |
| 2019/0259108 A1 | 8/2019 | Bongartz et al. |
| 2020/0005038 A1 | 1/2020 | Logie et al. |
| 2020/0068797 A1 | 3/2020 | Folle et al. |
| 2020/0196535 A1 | 6/2020 | Dagondon et al. |

\* cited by examiner

PLANT GROWTH PLATFORM

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to a plant growth platform that allows a grower to determine in real time crop growth rates, growth phases, and early warnings of crop instability to adjust and make changes to growing practices. The methods of the present invention also assists growers with yield prediction and harvest optimization. Output data from the sensors and user inputs are used to derive Growing Degree Units (GDU), irrigation optimization, soil health maps, tissue sampling tools, and nitrogen mineralization predictors. With this real time factual information the grower is in a better position to make well-informed decisions regarding grower practices including modification of irrigation, fertilization, cultivation, lighting, and other actions within the grower's control.

BACKGROUND

Over the years various systems have been implemented to monitor crop growth and field conditions. Various methods of crop monitoring practices have required stationary sensors positioned in the field. However, certain agriculture crop field sensors have had limited effectiveness over the life cycle of the crop. Instable power to field sensors, unreliable data transmissions, lost data, and inaccurate measurements have all contributed to unreliable monitoring of crop growth. Further, the delays in obtaining sensor information have made it undependable to optimize tissue sampling tools, soil health maps, irrigation modifications, and other grower practices based upon the time delayed data. It is therefore desirable to provide a method for continuous real time monitoring of a crop growth including the use of a field unit that systematically transmits reliable sensor data, thereby enabling real time data analysis for the grower. The method of the present invention includes determining a value associated with soil saturation, soil nitrogen mineralization, and growing degree units.

Also, as the crop begins to grow the height of the crop canopy may interfere with transmission of desired sensor data or reliability of sensor data. By way of example, a temperature sensor or light sensor covered by a crop canopy may provide data points that vary significantly from a temperature sensor or light sensor positioned above the growth canopy. The grower may be more interested in knowing data related to temperature, humidity and light conditions of air above the crop field rather than under the growth canopy. However, as the crop grows the sensors may be covered by crop canopy. Further, it may be preferred to make crop management decisions relying upon sensor data correlating with air above the growth canopy rather than sensor data measured under a growth canopy.

SUMMARY

Embodiments according to aspects of the invention provide for continuous real time monitoring a crop growth to allow a grower to make decisions based upon real time data. The platform of the present invention provides real time data and factual information to growers corresponding to data obtained from probes, field sensors and other accessories corresponding to soil moisture, soil temp, soil conductivity, soil oxygen, air oxygen, air temp, air humidity, air CO2, frost, solar radiation, wind, precipitation, GPS, etc. Further, a field unit sensor mount and support may be used to elevate one or more sensors above a crop growth canopy and to communicate sensor information to a base station. The sensor mount and support are capable of extension and retraction and provides a solid base support for the sensors when subjected to heavy winds and other inclement weather.

The method of the present invention includes the steps of providing field units for positioning within a boundary of a crop growth; linking the field units to a base station; transmitting and receiving data between the field units and the base station; obtaining data corresponding to outputs from field accessories including sensors; obtaining preferences for various user defined settings; determining values associated with soil saturation, soil nitrogen mineralization, and growing degree units; and making the determined values available to a user in real time (typically less than 45 minutes) from a time of obtaining data corresponding to the outputs of the field accessories. In embodiments of the invention the field units are capable of coupling to field sensors. Further, the user defined "settings" may include preferences for at least two items selected from the group consisting of the field units, the field sensors, a date range, and a soil decay rate.

According to aspects of the invention the method may further include the step of providing information to the user to allow optimization of tissue sampling tools dependent upon the values associated with the at least one of soil saturation, soil nitrogen mineralization, and growing degree units. Additionally, the method may include the step of providing information to the user to allow optimization of soil health maps dependent upon the values associated with the at least one of soil saturation, soil nitrogen mineralization, and growing degree units. Alternatively, the method may include the step of providing information to the user to allow irrigation optimization dependent upon the values associated with the at least one of soil saturation, soil nitrogen mineralization, and growing degree units. The method may also include the step of providing information concerning nitrogen mineralization predictors to the user. Further, the step of determining a value associated with soil saturation may further include determining field capacity and plant water extraction limit and optionally also estimating available water holding capacity (AWC). The step of determining a value associated with soil nitrogen mineralization further includes transmitting and receiving data from a soil temperature sensor and a soil moisture content sensor. The step may also include providing nitrogen mineralization predictors to the user.

Each field unit may include an arm member that may be adjusted to remain above the crop growth canopy. Select field sensors may be coupled to the arm member of each field unit such that data may be transmitted associated with at least one of ambient light, air humidity, and air temperature. Those skilled in the art will appreciate that the field sensors coupled to the field unit may include soil moisture sensors, soil temperature sensors, soil conductivity sensors, soil oxygen sensors, air oxygen sensors, air temperature sensors, air humidity sensors, air CO2 sensors, frost sensors, solar radiation sensors, wind sensors, precipitation sensors, and GPS location sensors.

In accordance with aspects of the invention the field units are capable of raising or lowering a sensor such that the sensor is positioned above a crop growth canopy. According to other aspects, the apparatus of the invention is capable of being activated remotely and may be remotely raised or lowered relative to a crop growth canopy. Further, the invention may also utilize a method for continuously positioning a sensor above a crop growth canopy. These and other embodiments according to aspects of the invention include an apparatus having an extendable pole, an arm member extending outward from an upper end of the pole, a sensor mount, a support having actuating legs, and a remote data transmit module housing. The extendable pole is capable of extending between a lowered and raised position. The extendable pole also has a coupling to secure the pole in a fixed lowered position and a fixed raised position. The sensor mount is positioned at an outer end of the arm member and is adapted for retaining a sensor. The support has a central column, an upper spacer member slidingly coupled to the central column, a lower spacer member slidingly coupled to the central column below the upper spacer member, and at least three folding legs linked to the central column. Each leg has an end portion rotationally joined to the upper spacer member and also has a mid-portion rotationally joined to the lower spacer member. The remote data transmit module housing is coupled to an upper end of the central column of the support member, and both the support and the remote data transmit module housing are releasably engaged to the extendable pole.

In use, at least one field unit is provided for positioning within a boundary of a crop growth canopy. Sub units and multiple accessories may be linked or coupled to a field unit. Each field unit may be secured in a field using an extendable pole, an arm member, a sensor mount, a support and a remote data transmit sensor housing. The extendable pole is capable of extending between a lowered and raised position. The extendable pole also has a coupling to secure the pole in a fixed lowered position and a fixed raised position. The arm member extends outward from an upper end of the pole. The sensor mount is positioned at an outer end of the arm member. The support has a central column, an upper spacer member slidingly coupled to the central column, a lower spacer member slidingly coupled to the central column below the upper spacer member, and at least three folding legs linked to the central column. Each leg has an end portion rotationally joined to the upper spacer member and each leg has a mid-portion rotationally joined to the lower spacer member. The remote data transmit module housing is coupled to an upper end of the central column of the support member. Both the support and the remote data transmit module housing are releasably engaged to the extendable pole and the arm member is adjustable to remain above the crop growth canopy.

Once the field units are positioned within the crop growth one or more field units and sub units are wirelessly linked to a base station or base server. Data from one or more sensors is transmitted from the field unit to the base station. The accessories, including the digital cameras, sub units and sensors are chosen dependent upon the crop being monitored and may include humidity sensors, soil moisture sensors, soil salinity sensor, temperature sensors, lights sensors, aeration sensor, to name just a few sensors known to crop growers. At least one of the sensors may be coupled to the arm member and the arm member may be adjusted to remain above the crop growth canopy. Data from the sensors is transmitted from the field unit to the base station. In accordance with aspects of the invention the transmitted data may be associated with at least one of ambient light, air humidity, and air temperature. The arm member may be further adjusted dependent upon a compilation of data from the field units.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Aspects of the present invention include an apparatus and method that provides a crop grower with continuous real time monitoring of a crop's growth. Generally, the method includes the steps of providing field units (and potentially linked sub units) for positioning within a boundary of a crop growth; linking the field units to a base station; transmitting and receiving data between the field units and the base station; obtaining data corresponding to outputs from accessories linked to the field units; obtaining preferences for various user defined settings; determining values associated with soil saturation, soil nitrogen mineralization, and growing degree units; making the determined values available to a user real time; and adjusting irrigation protocol, field units, accessories, or other grower practices dependent upon outputs.

In embodiments of the invention the field units are capable of coupling to field sensors, digital cameras, sub field units and other electronic devices. Further, the user defined "settings" may include preferences allowing a user to refine the data output for the particular grower's needs. The field units are coupled to sensors and may be interfaced with portable devices or internet linked computers to display crop related real-time data & historical trends, Growing Degree Units (GDU), alerts, notifications and helpful tools for managing notes, tasks, soil test data, tissue sample data, photos, or links to crop specific reference materials.

Figure 1:
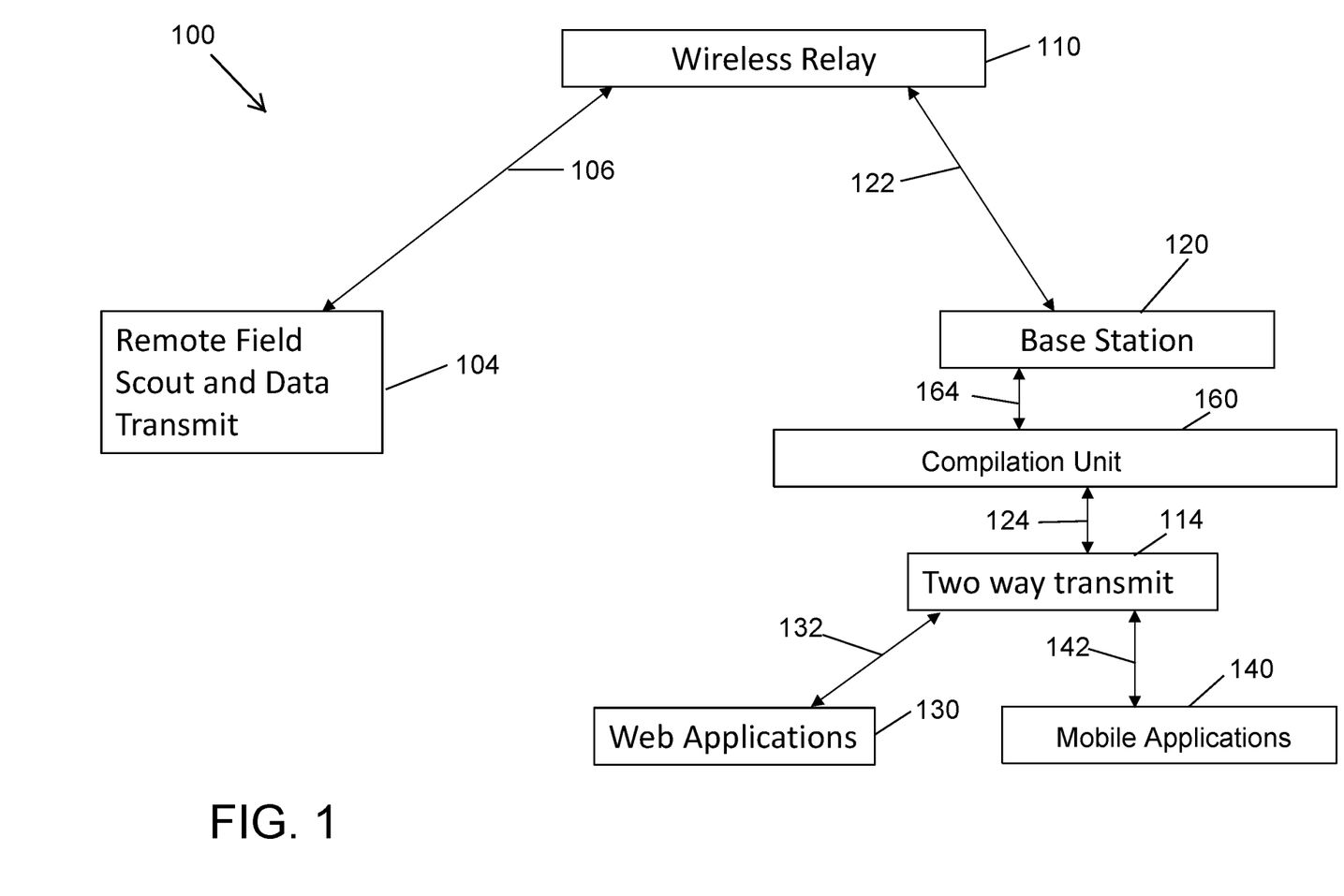
FIG. 1 is a schematic of an embodiment of a remotely operable field unit and base station in accordance with the present invention.

With reference to FIG. 1, a field use schematic 100 illustrates the interplay between a remote field unit data transmit module 104, wireless relay 110, and base station 120. Once accessories such as sensors, cameras and sub field units are attached or wirelessly linked to a particular field unit and the field unit data transmit module 104 is activated, the remote data transmit module 104 of a field unit 410 transmits and receives (represented by 106) data or information with wireless relay 110. The wireless relay 110, in turn, transmits and receives data 122 with base station or base servers 120. Base 120 includes a compilation unit 160 that is interfaced thereby allowing a two way transmit 114 to transmit outputs, including data and control commands, to and from web applications 130 and mobile applications 140. The transmissions occur through interconnects 164, 124, 132, and 142 which may be physical or wireless. The two way transmit 114 is coupled at 132 to internet or web applications 130 and is coupled at 142 to mobile applications 140, such as a phone or tablet. Both the web applications 130 and mobile applications 140 are linked or coupled (represented by 132 and 142 respectively) to two way transmit and int turn to compilation unit 160 at 164. The electronics for the compilation unit 160 may, for example without limitation intended, reside at the base servers or station 120. The coupling and interplay of electronic components allows a grower to seamlessly access data or information from a field unit 410 (together with the accessories and sub units coupled to the field unit) and further make decisions and transmit control commands based upon real time data.

Figure 2:
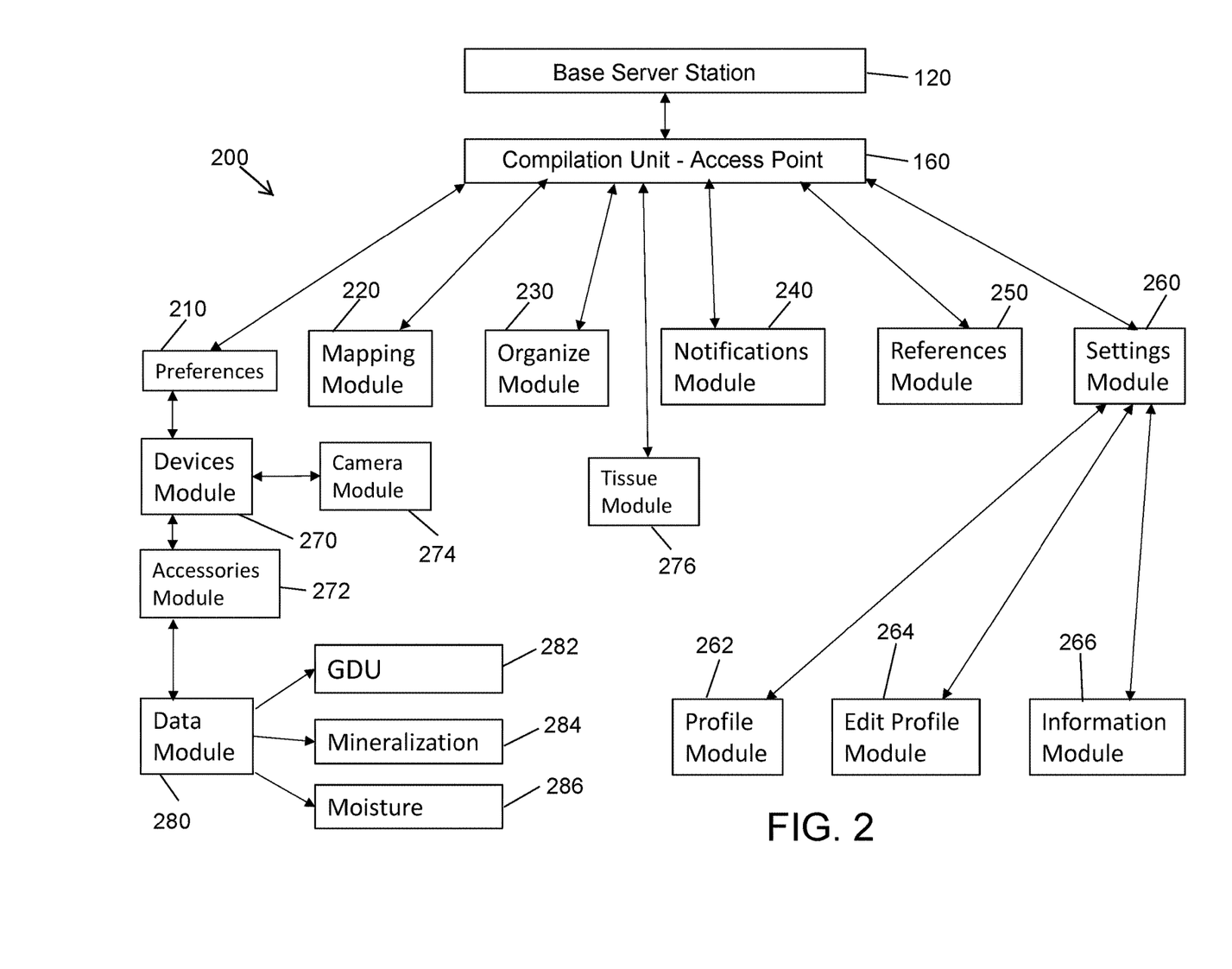
FIG. 2 is a schematic of an embodiment of a compilation module in accordance with the present invention.

Referring next to FIG. 2, a module schematic 200 illustrates the inter-workings of compilation unit 160. The compilation unit 160 is comprised of several sub modules including device module 270, mapping module 220, organize module 230, notifications module 240, references module 250, settings module 260, accessories module 272, camera module, 274, tissue growth module 276, profile module 262, edit profile module 264, information module 266, and data module 280. A user or grower may access the compilation unit 160 through the base unit or base station 120 with the use of a web application 130 or phone application 140. The web and phone applications are made available to the user, along with the field unit 410, under a password or other authentication protocol. Once the user is logged into the compilation unit 160 access point via the base unit 120 from the web or mobile app, the various modules 210-290 are accessible by the user.

From the compilation unit access point the user may enter preferences 210 as well as control commands for the device module 270, camera module 274, accessories module 272 and other electronics coupled to a field unit 410.

The device module 270 provides a list of field units that are currently accessible by the user. For each field unit the user may access an accessories module 272 that provides technical details regarding the field unit and all sensors, sub units, cameras and other electronics coupled to the field unit. By way of example, and without limitation intended, technical information related to the field units internal temperature, location (determined from gps coordinates), orientation (determined from gyroscope outputs, modem signal strength, battery strength, and internal humidity may be utilized to determine a real time status of each field unit. A notification or alarm may be transmitted to the user when any of parameters of the technical information exceeds or falls below thresholds set in the preferences 210. In this manner a grower may be alerted in real time if the gps position unexpectedly changes (perhaps indicating attempted theft in progress) or a field unit tips over allowing a grower to respond in real time. Other self diagnostic tools for each field unit may be utilized to alert or notify the user of unit conditions deviating from preset norms. The user may then act in response to the alarm or other notification. Further, details associated with sensor output data for each connected field unit is available through the accessories module 272. Power management may be augmented with a solar panel charging unit and super capacitors allowing a user to choose a shorter time period for polling of each field unit (transmitting and receiving output and control commands of the field unit) without draining the battery below operable output.

Further, charts corresponding to sensor outputs, selected criteria or derived GDU's are accessible from the accessories module 272. Sub field units may be coupled to a field unit via cellular, wifi or other wireless technology. Each sub field unit may include single or multiple dedicated sensors (such as a soil oxygen or moisture sensor). Camera module 274 may link to 1 or more digital cameras. A 5G gateway allows for efficient transmission of photo files from the cameras. Those skilled in the art will appreciate that the one or more cameras may be utilized to monitor the health of the plant. By way of example, four cameras may be coupled to one or more field units or sub field units. The first camera may be equipped with a micro lens and oriented to take close up or micro images of a plant. The images may be transmitted real time. Image analysis and Artificial Intelligence may be utilized to create a data set over time that allows the notification module to alert the grower if the leaf images deviate from preset norms. A second camera may be equipped with a wide angle lens and oriented above a growth canopy. The first and second cameras may be further utilized to determine the growth stage and yield estimates of the crop. The third camera may be equipped with a VARI algorithm or may be equipped to capture near infrared light (NIL). From the images received from camera three, the camera module may include an algorithm to determine Normalized Difference Vegetation Index (NDVI). The grower may utilize the NVDI measurement to assess the amount of live vegetation and its health in the growth zone. A fourth camera suitable for providing night time images may further be utilized by the grower to determine a health characteristic of the vegetation. Additionally, the camera module may be utilized to communicate or notify the grower of a verification of GDU for a growth stage, early detection of pests, yield estimates or nutrient deficiencies. From the accessories module 272 a user may also access data module 280. The data module 280 provides access to configuration information and resulting output data for soil nitrogen mineralization 284 and soil moisture parameters 286. The output related to nitrogen mineralization is iterative over time and indicates to a grower when they don't need to add fertilization during the growing season. Over time a field is monitored to determine fertilization needs. Further, as the data output becomes more robust, the amount of fertilizer needed at a given time may be adjusted to equal the total nitrogen need minus the cumulative produced nitrogen. The output from the soil probes coupled to the field units is utilized to determine the cumulative produced nitrogen. The soil moisture parameters 286 may be used to determine the desired irrigation notification. The irrigation notification may inform the grower how much to irrigate, when to irrigate, and the expected return on investment dependent upon the actual irrigation schedule. Also, information correlating with GDU's 282 is available through the data module 280. Although the Growing Degree Units may be preset or estimated initially dependent upon type and strain of vegetation, over time the GDU's may be derived or estimated from the grower's historical data output. Additionally, a grower may choose to graphically represent the GDU's overlayed with plant health characteristics, observed pest activity, or other output obtained from the field units over the same time period. The determined GDU output may be linked with the Tissue Module 276 and utilized to inform the grower when the optimum time would be to take tissue samples. The notification module may inform the grower the preferred time to take a tissue sample, from which plant in the growth zone, how to care for the sample, and where to send the sample.

Mapping module 220 is accessible from the home screen of the website communication platform or access point of the compilation module 160. The map module utilizes GPS sensor outputs from each field unit to assist a user to visualize the location of each field unit. The mapping module may provide the user with a visualization of outputs from the other modules correlated with a particular zone or area within the crop growth being observed. The mapping module may further allow a user to visualize the location of the field units and corresponding accessories (including the camera locations and sub field unit locations). The mapping module 220 may be linked with the notification module 240 wherein when a notification corresponds or is dependent upon a particular field unit or accessory, that field unit or accessory may be represented in a different color on the map to indicate that a notification is pending for that particular unit. Further the mapping module may be linked to the details module wherein the app derives information to modify the maps to indicate soil health. Further, by way of example and without limitation intended, the maps available from the maps module may be divided into a grid (corresponding to a grid of field units) and may integrate information and outputs from the details module 270 and data module 280. Further, these maps may be modified to indicate soil moisture, soil nitrogen mineralization, GDU, historical and anticipated yields to assist the grower in visualizing the crop growth information.

The organize module 230 provides a platform within the web application platform for the user to track calendar events, add, edit or remove calendar events, input notes, or link photos to the calendar events or notes. In addition, the organize module 230 may include a time stamp interface to user inputted notes and photos. A user my have the option to identify the type of note it is (for example, notes regarding planting, seeding, irrigating, etc.) with an option to later search notes based upon note identification. The user may take photos with a digital device and upload them to the organize module with an option to classify the photo to share, store, content, relevance, etc. The organize module may be linked to the other modules and may include search protocols to allow a user to associate data and outputs with a particular event or calendar date.

Notifications module 240 is linked with the other modules and allows a user to set parameters in the settings module 290 whereby when a parameter is exceeded a notification or alarm is automatically sent to the grower's stored contact information. Notifications may include various types and levels such as a warning, critical alarm, or system type update. The user may customize notifications based upon desired timing of notification or may be set dependent upon a logic based determination such as correlating two or more data points to determine if a preset criteria to initiate a notification is met. An exemplary notification may be an alert to the grower when the soil saturation level either exceeds or falls below a preset level. The grower may determine that a crop is more susceptible to disease if the soil saturation level is twenty percent above a predefined norm and the plant may be subject to will or death if the saturation level falls five percent below a defined level. A unique and distinct predetermined alarm or notification may be transmitted, thereby prompting the grower to consider modifications to the irrigation schedule. Alternatively, autimatic controls may be implemented to control the engaging and disengaging of the irrigation system. Further, historical as well as current notifications may be viewed through the notifications module 240 to further assist the grower with determining whether to modify the notification settings, predict future irrigation schedules, or to manage current irrigation schedules.

Reference module 250 is accessible through the compilation unit access point or home page. The reference module provides a platform for the user to store selected references. Additionally, a subscription may be provided that allows user access to additional recommended content that is dependent upon or determined based upon the user profile, user dependent outputs and user preferences. Further, additional references may be suggested and made available to the user dependent upon data outputs and environmental/plant growth conditions. As the data output develops historical reference points additional references may be recommended to the user.

The settings module 260 and sub modules 262, 264 and 266 allows a user to input, edit and modify the field unit names and locations, user profile and details, user preferences dependent upon selected crop and region, and sensor unit names and locations (dependent upon each field unit). The about module 266 under the setting s module 260 provides technical information and operational information about the field unit, hardware information and potential restrictions on use of the field units. Module 260 may further provide technical support information and contact information.

Figure 3:
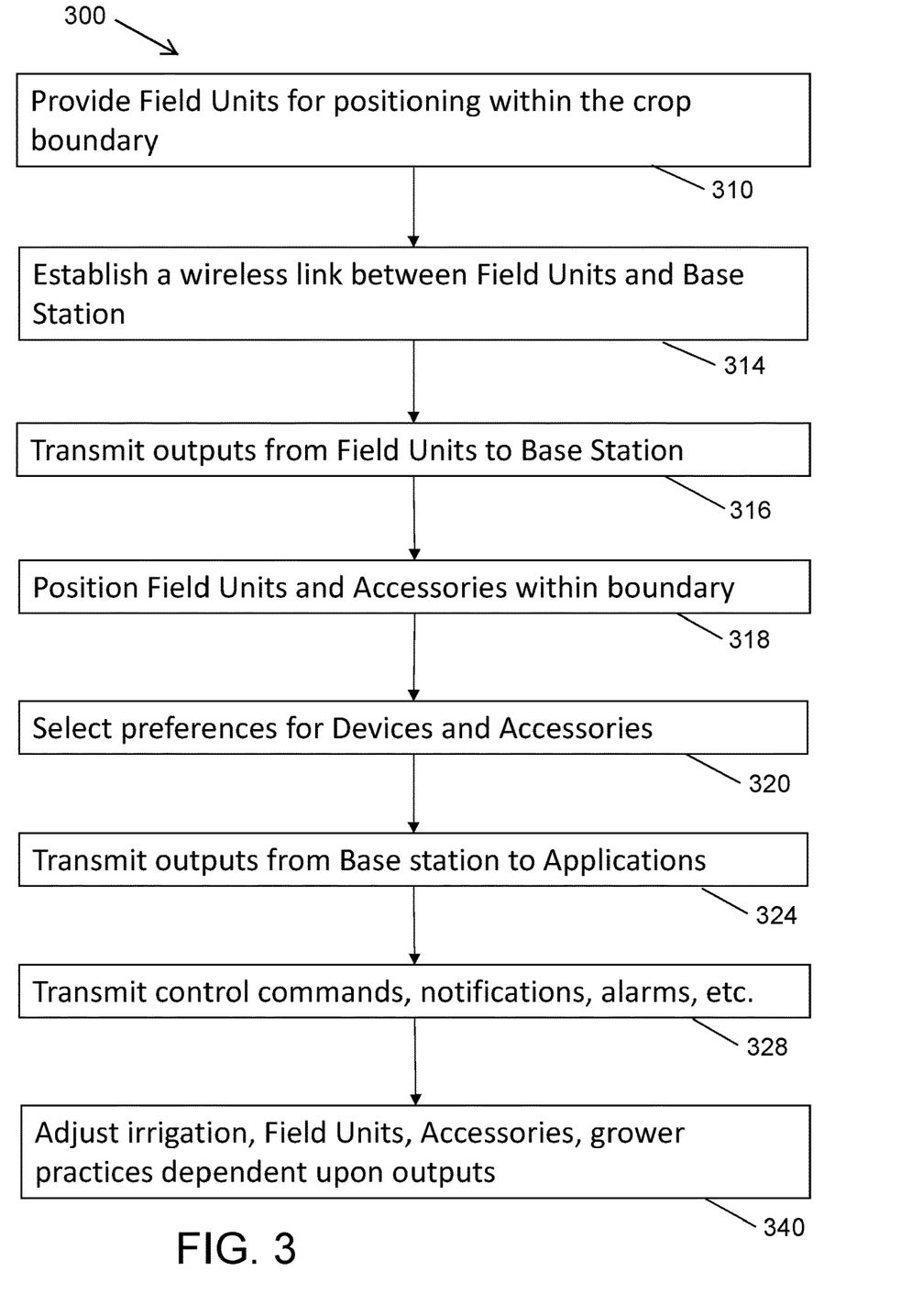
FIG. 3 is a flow chart of an embodiment of a method in accordance with the present invention.

Without limitation intended, FIG. 3 illustrates an exemplary use of the plant growth platform of the present invention. Field units 410 are provided to growers for positioning within the boundary of a crop growth canopy, illustrated at 310. The particular crop to be monitored and position within the crop field is determined by the grower. Once the field units 410 are positioned within the field, a wireless link is established 314 between the field units 410 and base station 120. With a link established, outputs from the sensors, cameras, sub units or other electronic components are transmitted 316 from the field units 410 to the base station 120. The data is organized and further compiled and is accessible by the grower through a link to a web app or phone app. The soil sensors are positioned below the crop canopy and the field unit's are adjusted within the field boundary 318. The location within the field is dependent upon the particular crop, type of sensors and soil characteristics. The sensors are selected and coupled to the field unit 410 in accordance with the particular crop being monitored. The user selects and inputs preferences for the field unit, coupled sensors, date range, and soil decay rate 320. Depending upon the particular activated sensors, outputs or information associated with ambient light, air humidity, and air temperature and other parameters being monitored may be transmitted 324 from the remote data transmit module of each field unit 410 to the base station 120 and from the base station 120 to user web or mobile applications. The compilation module 160 of base unit 120 utilizes the transmitted output, previous compiled outputs, user inputs, and/or reference data to compile data or information associated with Growing Degree Units (GDU), soil moisture saturation, and soil nitrogen mineralization 328. This data or information is then made available and transmitted to the grower. Notifications, control commands and alarms may also be transmitted to the grower 328. The grower or user utilizes this output information to manually or automatically make adjustments to irrigation schedules, field units, accessories, grower practices, and nitrogen mineralization predictors 340 (to name just a few). Also, the field units 410 may be adjusted automatically or manually dependent upon output and/or compiled sensor data.

Further, in use, the crop grower obtains and is provided with field units that are positionable within a boundary of a crop growth canopy. Preferably, more than one unit is positioned within the boundary of the crop. A grid or matrix of spaced apart field units positioned within the boundary is further preferred. Each field unit is capable of coupling to one or more field sensors. Without limitation intended the field sensors coupled to each field unit may include one or more of the following sensors: soil moisture sensors, soil temp sensors, soil conductivity sensors, soil oxygen sensors, air oxygen sensors, air temperature sensors, air humidity sensors, air CO2 sensors, frost sensors, solar radiation sensors, wind sensors, precipitation sensors, and GPS location sensors. Those skilled in the art will appreciate that other sensors, which a grower of certain crops may desire data from those other sensors, may be coupled to the field units without departing from the scope of the invention.

The sensor output data may be transmitted wirelessly from the field units in one of several modes. The wireless aspect of the invention may include wi-fi, z-wave, cellular, Bluetooth or other wireless systems capable of transmitting and receiving data and commands between the field units and base station. The plurality of field units may be wirelessly linked together with known suitable wireless communications. By way of example and without limitation intended, a bi-directional Wireless Link Module (WLM) modem may be coupled to each field unit. Data output from sensors coupled to each field unit may be transmitted via the WLM to a master field unit that is coupled to the base unit. A MODBUS communication protocol and RS 485 electrical standard may be utilized to transmit wirelessly. Alternatively, each field unit's WLM may couple to a wireless card and router to transmit data to a receiver such as the base unit, a smart phone or other computer via wi-fi and the internet if service is available.

Field units 410 may include sensors to measure soil moisture and soil temperature at regular time intervals (e.g. 15 minutes) and at varying specified depths. The data from these sensors, when collected over multiple growing seasons may be used to assess important soil moisture parameters, including field saturation (FS) moisture content (%), field capacity (FC) moisture content (%) and plant water extraction limit (PWEL) moisture content (%). These parameters can also be used to estimate other parameters, including plant available water holding capacity (AWC).

An exemplary methodology for estimating FS, FC and PWEL provides a simple approach that is quickly and easily interpreted. A spreadsheet is populated with two columns of data. The first column includes information about the time and date of data collection. The second column includes corresponding volumetric soil moisture measurements (%) from the sensor(s). Using data analysis of the spreadsheet, the data in the spreadsheet columns may be converted into a histogram of measured soil moisture values, with the y-axis for the histogram being frequency of observation and the x-axis being a "bin" for measured soil moisture. Bins are typically assigned values such as 4-6, 6-8, 8-10, 10-12 . . . 30-32, 32-34, 34-36, 36-38, 38-40, 40-42, 42-44, 44-46 (etc.), where the numbers represent a range of measured volumetric soil moisture values.

A value associated with Field saturation is simply determined by comparing the values in the various bins and identifying the bin with the largest observed value for soil moisture. The bin with the largest observed value is used to identify FS at or near that sensor. The FS for multiple sensors may be averaged to provide an average FS for the field. FC is determined by identifying the value of the bin with the highest frequency of observation (for the right hand peak when a bimodal distribution exists). Plant water extraction limit (PWEL) is not discernable in the case when long-term observations fail to include a period of drought. When the observation includes a drought event (low soil moisture for a period of time), the histogram will have a bimodal shape. The PWEL in this case is the value of the bin with the highest frequency of observation on the left hand peak of the histogram. Plant available water holding capacity (AWC) is simply determined by taking the difference between FC and PWEL. The FS and FC may be modified dependent on soil type and alternatively may be used to predict soil type. For example, if the resulting data for FC=18% and AWC=10% then this data suggests a soil texture of coarse sandy loam, loamy very fine sand or loamy fine sand. If the resulting data for FC=22% and AWC=12% this data would suggest a soil texture of sandy loam. Further, a resulting data of FC=34% would suggests a soil texture of loam.

Crops experience water stress when plant available water is depleted significantly. The allowable soil moisture depletion before irrigation is needed depends on the crop species, soil texture, and crop growth stage. A common guideline is to irrigate when plant available water is depleted by 50%. The user may set notification preferences to alert the user when the soil moisture decreases below a predefined percent.

Field capacity is the soil moisture content attained after a soil is saturated and allowed to drain freely for two to three days. At field capacity, the soil has an optimum supply of water for the plant, along with an adequate supply of oxygen from gas filled pores. When irrigation is applied, the objective is often to add enough water to wet the soil up to field capacity. To estimate the depth of water that should be added by irrigation, it is necessary to know the initial soil moisture content ($\Theta i$), the depth of soil (L), and the field capacity water content (FC). The depth of water added by irrigating (dw) is simply the depth of water held by the soil at field capacity (dwfc) minus the depth of water held by the soil initially before the onset of irrigation (dwi). The depth of water held by the soil at field capacity is dwfc=FC*L, while the depth of water held by the soil prior to irrigation is dwi=$\Theta i$*L.

Nitrogen (N) mineralization is a process in which soil organic matter (SOM) is broken down by microorganisms, releasing organic nitrogen in the form of ammonium (NH4+) that can be taken up by crops. Ammonium can also be converted to nitrate-N (NO3—N), which can be taken up by crops, leached through the soil or further converted to nitrogen gas through denitrification. Because of the challenges in estimating N mineralization rates, farmers making nitrogen fertilizer recommendations often ignore the contributions of SOM to N mineralization, resulting in over application of N fertilizer. Those skilled in the art are familiar with algorithms for estimating nitrogen mineralization in soil based on variations over time in soil temperature and soil moisture. As soil temperature increases, soil biological processes that include N mineralization increase exponentially before levelling off. This increase may be characterized to predict nitrogen mineralization dependent upon observed soil temperature and soil moisture. Soil moisture also affects N mineralization. Dry soils have slower mineralization rates than soils at optimum moisture contents. In similar fashion, excessively wet soils have slower mineralization rates than soils at optimum moisture contents. For improved generality, soil moisture content is represented in terms of the relative saturation (s), which is the soil moisture content divided by saturated soil moisture content. Saturated soil moisture content can be obtained using an analysis of field unit outputs taking into account SOM. Between transmissions, the sensor data may be obtained (data polling) and stored. The data polling may occur, for example, between every 15 minutes to two hours depending upon the battery conservation protocol. Transmission between the base unit may occur frequently or the user may set the amount of time between updates.

As a further example of a particular use of the plant growth platform, and without limitation intended, a grower may position multiple field units 410 in a vineyard along a slope of the hillside or field. The grower may select sensors to monitor the moisture and oxygen levels within the soil next to a selected vine but may also desire monitoring of the air temperature, amount of light exposure, and humidity above the height of the vine. The height of the sensor arm for each field unit may be adjusted dependent upon the height of the nearby vines. The grower may monitor data from each field unit and may, for example, make irrigation and fertilization decision dependent upon the compiled data resulting from the information obtained from the field units. Further, information from the field units assist the grower in determining variations in vine growth dependent upon location of the vine within the field. This information may be helpful in accessing future irrigation or fertilization plans.

The field unit 410 of the present invention is particularly well suited for remote transmission of crop growth and field condition data or information to a base unit 120. Depending upon the crop being grown, the desirable height of the sensors above the crop growth canopy may be varied. The field unit 410 is particularly well suited to maintain selected sensors at a desired height above a crop growth canopy. A worm drive, turbo motor and separate power supply may be utilized to actuate the sensors to a desired height. Also, the field unit provides a stable sensor mount that reduces the need for continuous maintenance. With reference to the FIGS. 4-10, various embodiments according to aspects of the invention will be described in greater detail.

Figure 4:
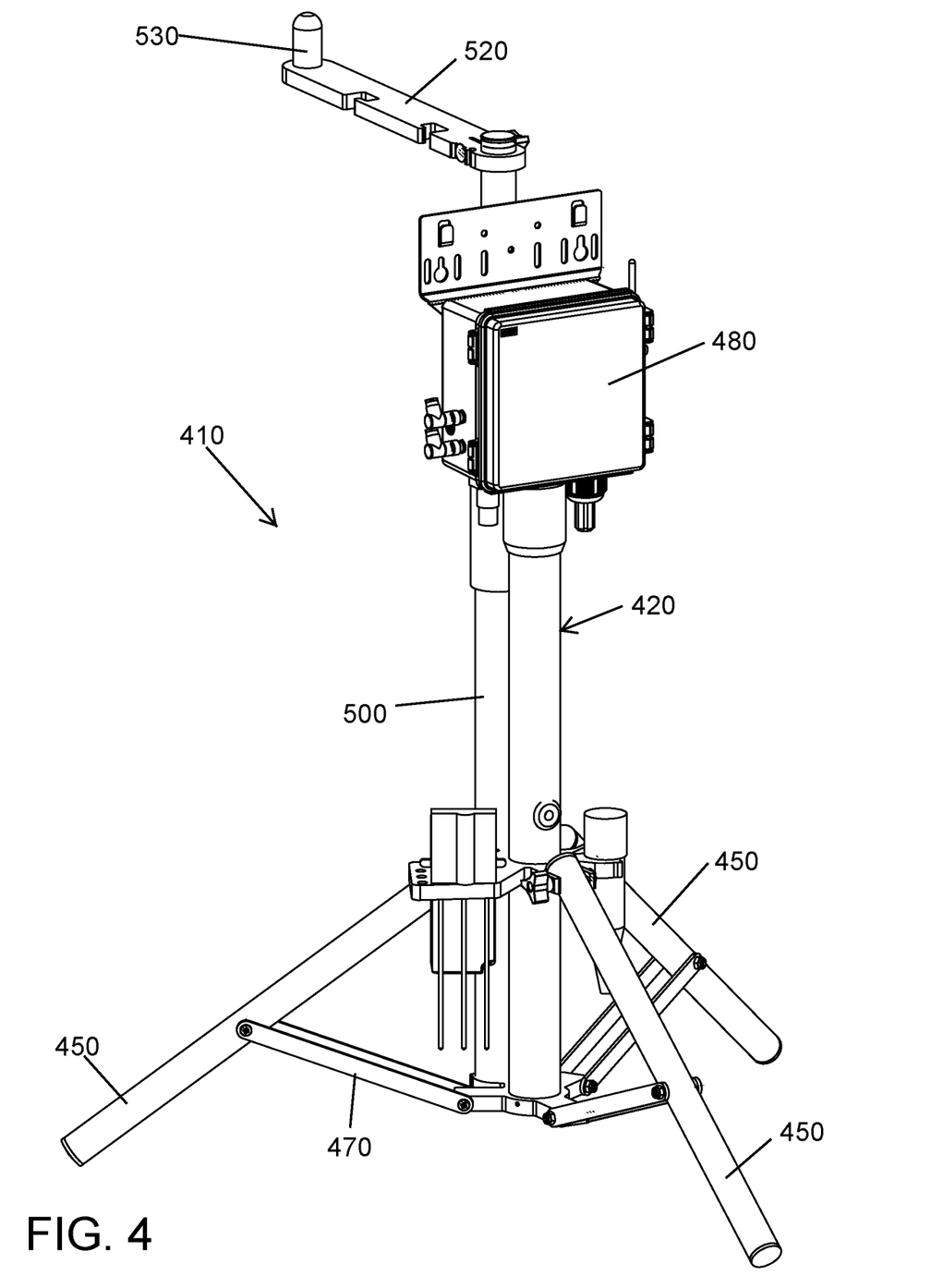
FIG. 4 is a front perspective view of a field unit mount of the present invention shown in a lowered wide position.
Figure 5:
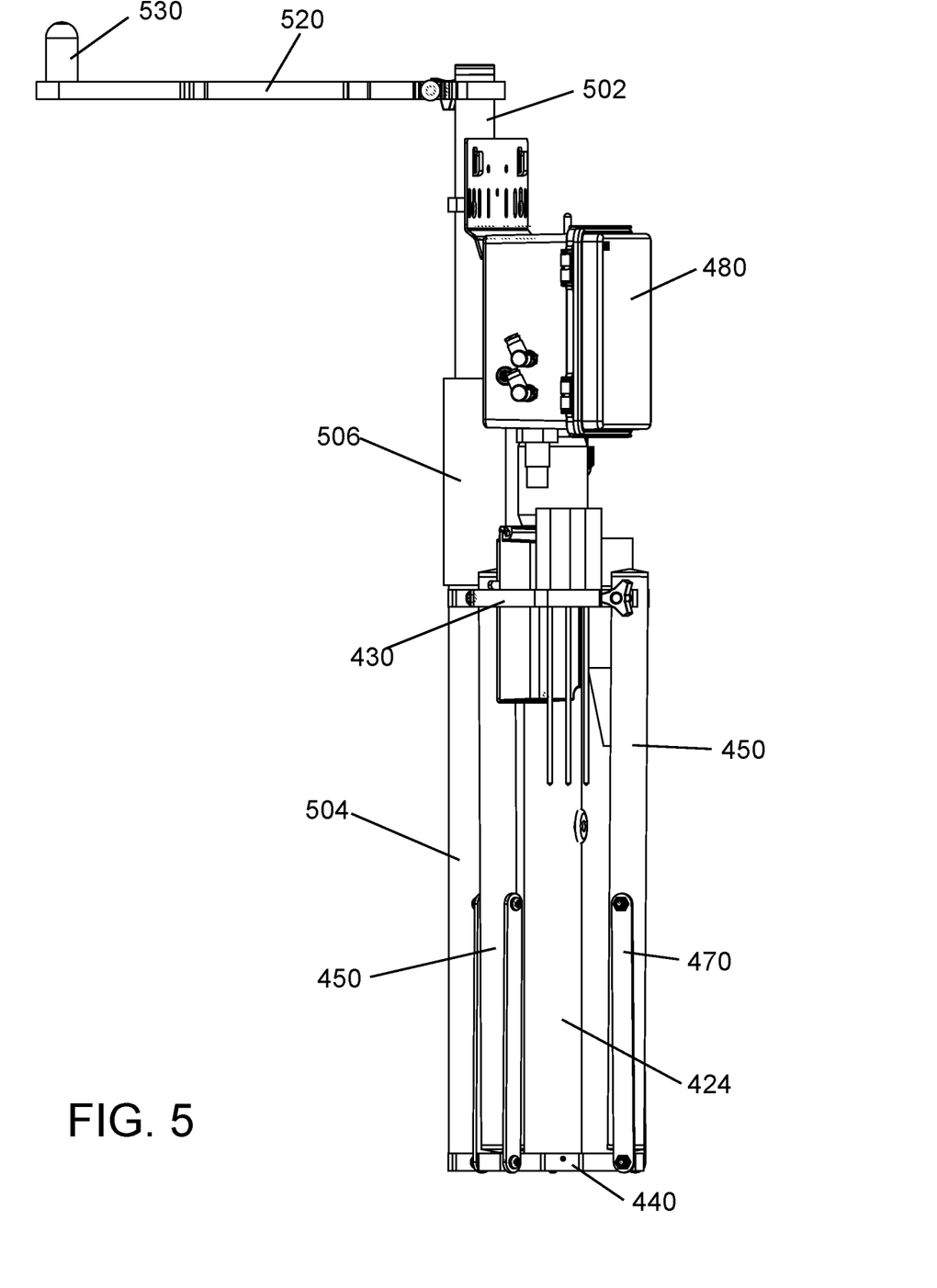
FIG. 5 is a side perspective view of a field unit mount remote of the present invention shown in a lowered narrow position.
Figure 6:
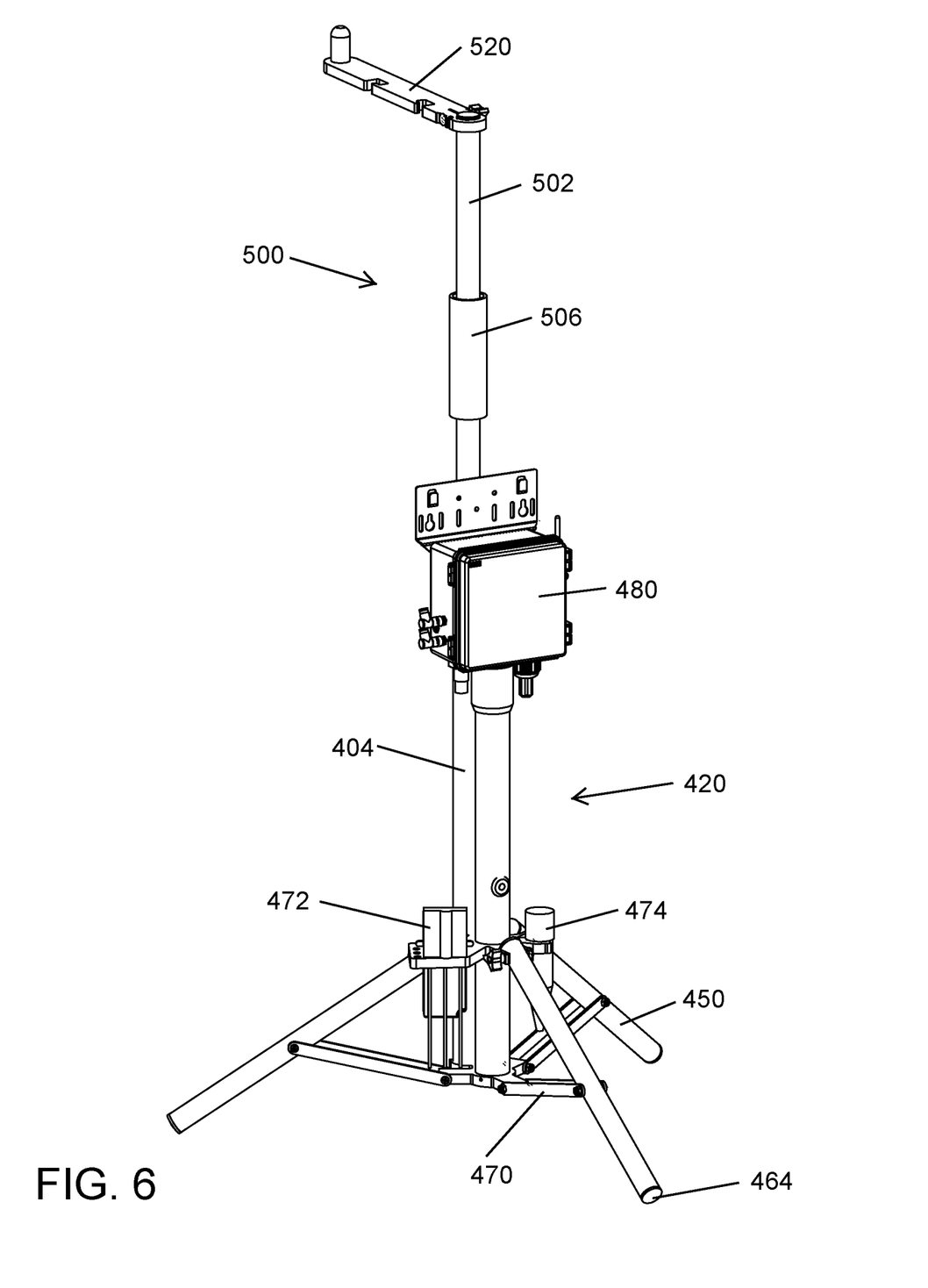
FIG. 6 is a perspective view of a field unit mount of the present invention shown in an extended wide position.
Figure 7:
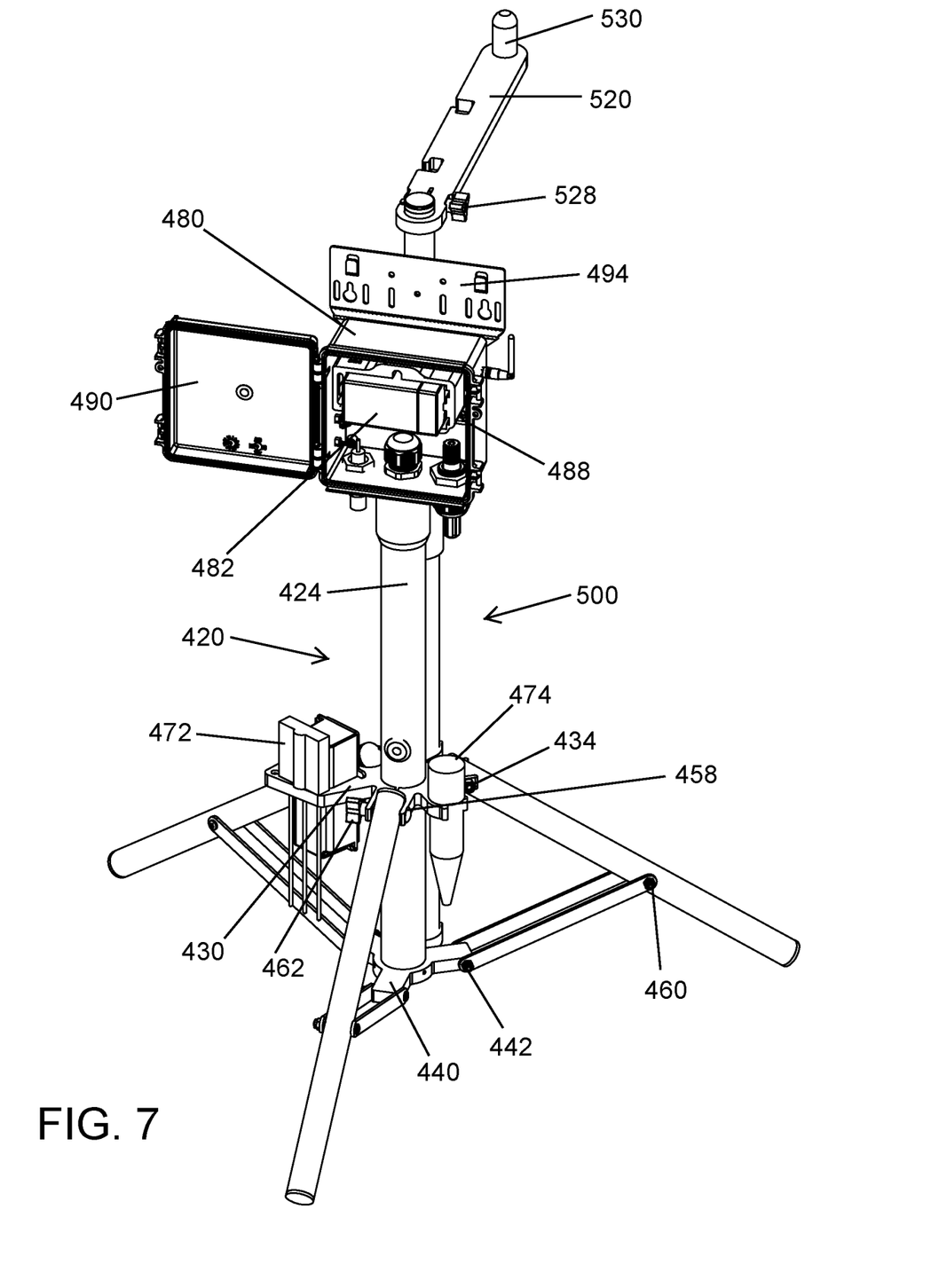
FIG. 7 is an upper perspective view of a field unit mount of the present invention shown in a lowered wide position and showing the remote data transmit module housing in an open position.
Figure 8:
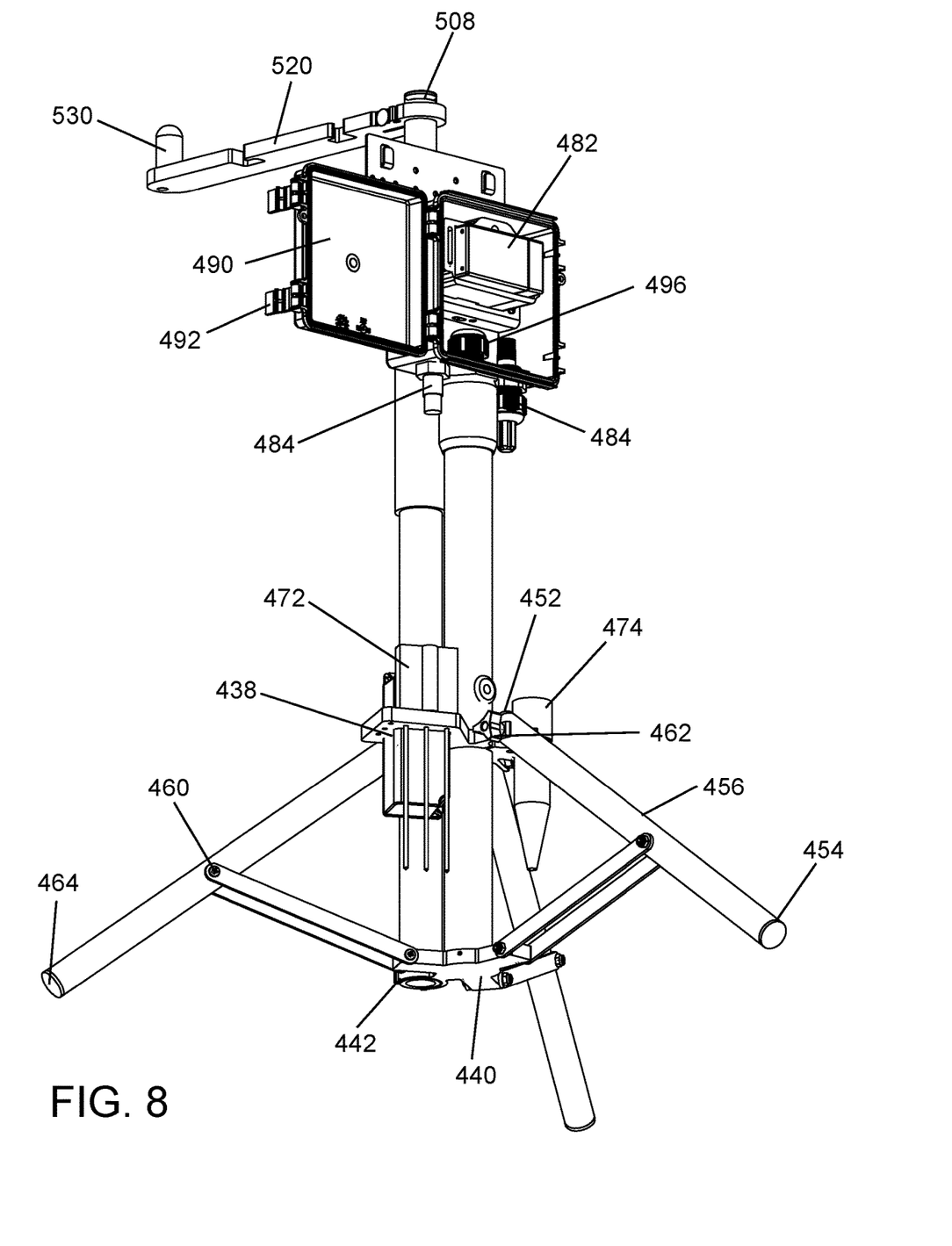
FIG. 8 is a lower perspective view of a field unit mount of the present invention shown in a lowered wide position and showing the remote data transmit module housing in an open position.
Figure 9:
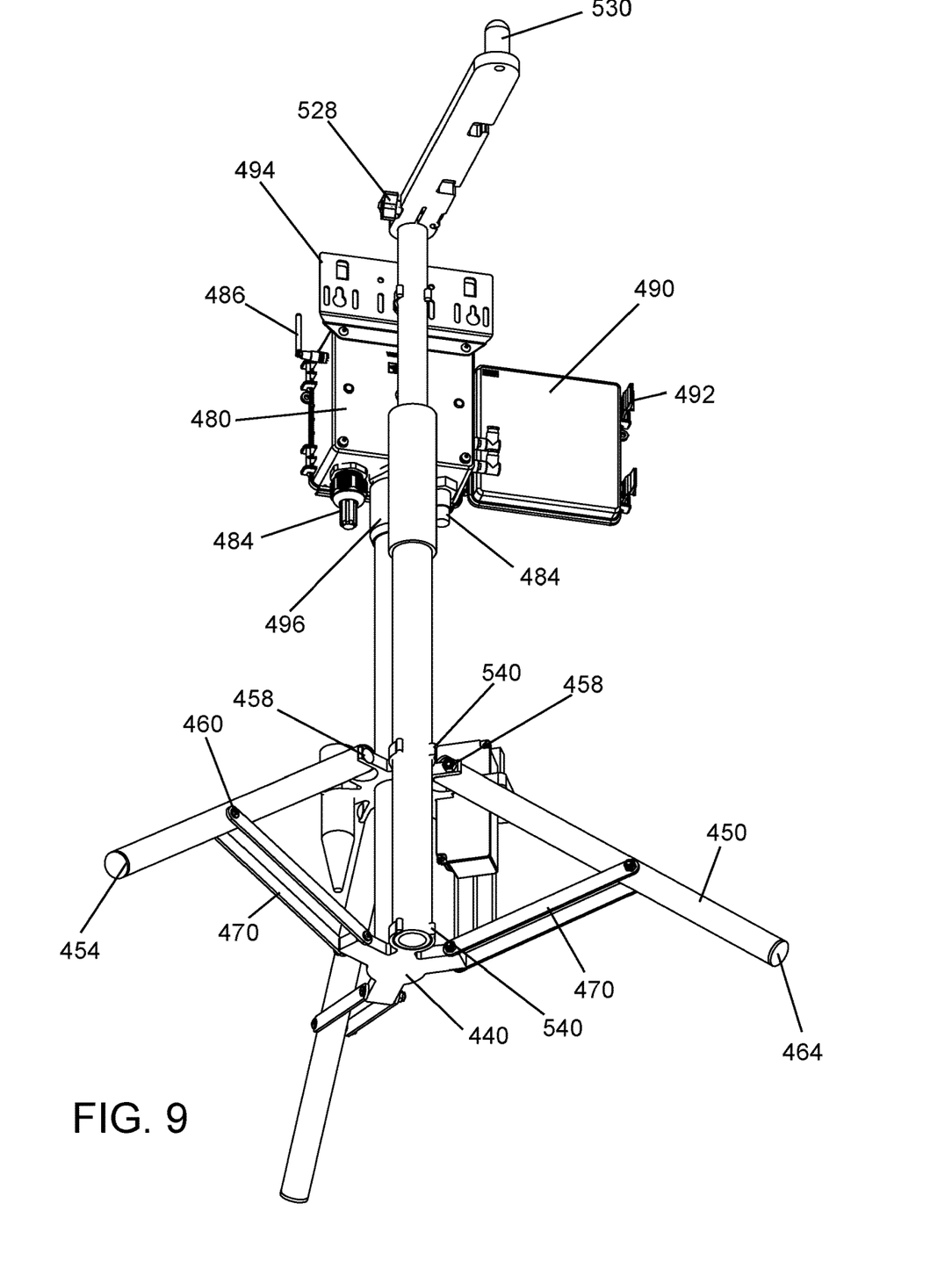
FIG. 9 is a lower back perspective view of a field unit mount of the present invention shown in a raised wide position.
Figure 10:
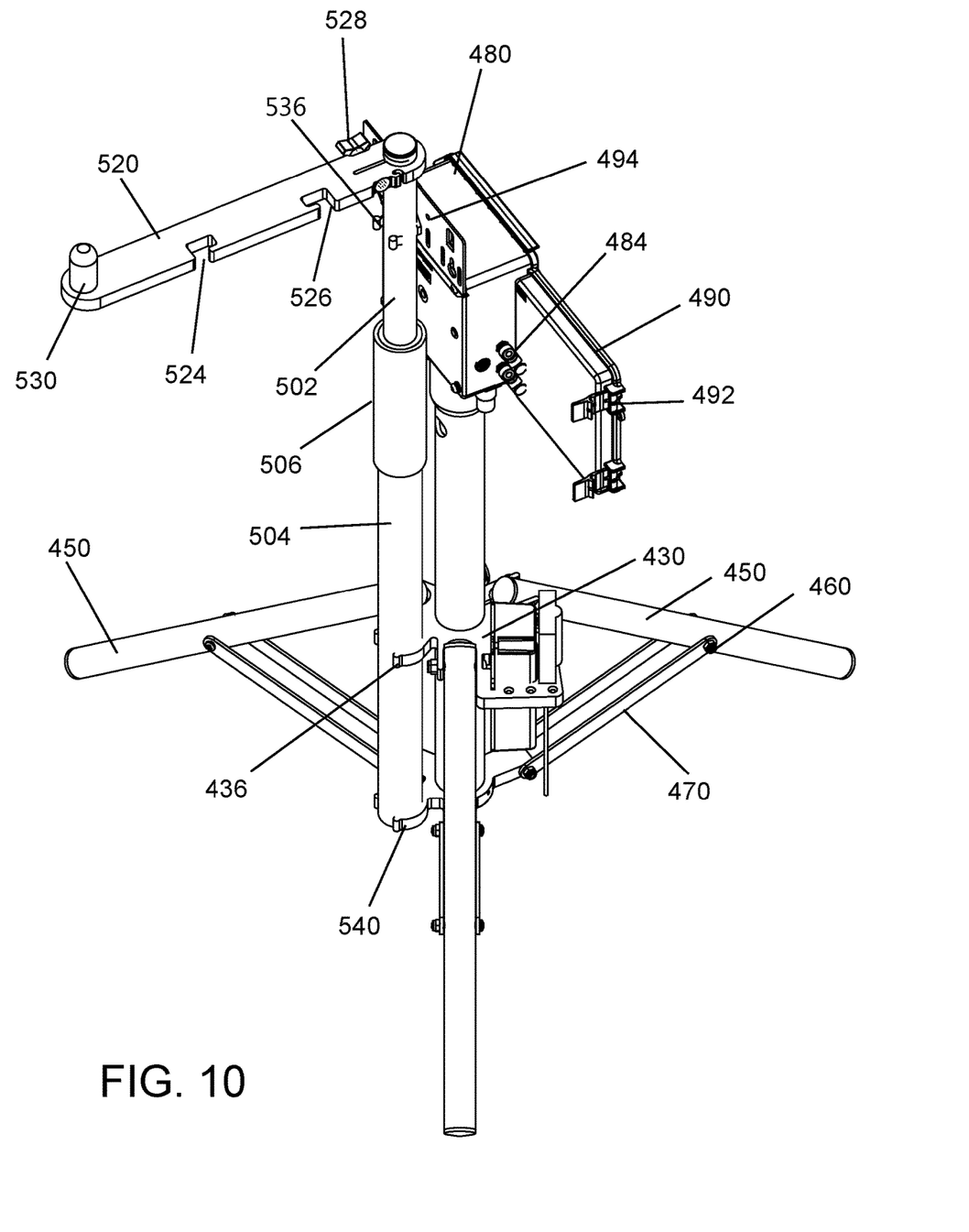
FIG. 10 is an upper side perspective view of a field unit mount of the present invention shown in a raised wide position.

With reference to FIGS. 4-6, a field unit 410 is shown having the support 420 in the expanded (FIGS. 4 and 6) and contracted (FIG. 5) positions and the telescoping pole 500 in the extended (FIG. 6) and retracted position (FIGS. 4 and 5). The flexibility of the field unit allows a user to adjust the unit dependent upon the field terrain and crop growth height. The support 420 includes a central column 424, an upper spacer member 430, a lower spacer member 440, and legs 450 rotationally coupled to the upper and lower spacer members. The rotational coupling of the legs to the support members generally includes linkage 470 and a joint or pins 458 and 460. Remote data transmit module housing 480 and pole 500 are coupled to the central column 424 of the support 420. An arm member 520 is fixed to an upper end of pole 500 and a sensor 530 is fixed to an outer end of the arm member 520. Sensors 472 and 474 are shown attached to the upper spacer member 430. The field unit 410 may further include a wireless controlled actuator of suitable construction to raise and lower the pole and may further include a solar panel of known suitable construction coupled to the remote data transmit module to provide power to the actuator, sensors and wireless remote data transmit module. Further the telescoping pole may be utilized as an optional antenna for wireless transmission. The wireless aspect of the invention may include wi-fi, z-wave, cellular, Bluetooth or other wireless systems capable of transmitting and receiving data and commands (one such embodiment being represented in field use schematic 100). Operating system apps may also be utilized to create additional functionality for the module.

With reference now to FIGS. 7-10 the upper spacer member 430 includes a central aperture 432 extending through the spacer member 430 through which central column 424 slides. Similarly, lower spacer member 440 includes a central aperture 444 partially extending through the spacer member 430. Column 424 fits into aperture 444 and the bottom of column 424 rests upon the lower spacer member 440. Fingers 434 are formed in the upper spacer member 430 and are well suited to firmly grasp soil oxygen sensor 474. Additional fingers or clamps 436 and 540 are formed in the upper and lower support members 430 and 440 respectively. The fingers or clamps are sized to firmly grasp lower section 504 of extendable pole 500. Slots 438 are formed in the upper support member 430 and are adapted for receiving additional sensor 472 and module 476. Lower spacer member 440 includes rotational joint 442 that receives upper or fixed end 452 of leg 450. The lower or ground end 454 of the legs 450 includes a plug 464 that inserts into the open end of the leg 450 and blocks soil from inserting into hollow legs 450. Alternatively, the plug 464 may be substituted with a tine stile end for each leg to allow a user to push the tine and secure each leg to the ground. A mid portion 456 of each leg includes a rotational joint 460 and the end 452 of each leg includes a rotational joint 458. Clamps 462 secure the end 452 to the upper member 430. Linkage 470 is rotationally fixed to the lower spacer member 440 at rotational joint 442 and an opposite end of the linkage is rotationally fixed to the mid rotational joint 460 of the leg 450. As the upper member 430 slides up the central column 424 the legs 450 contract inwards and as the upper member 430 slides downward the legs 450 rotate and expand outward.

Remote data transmit module includes housing 480 that is connected to the central column 424 with a fixed ring 496 that engages with the column 424 to fix the housing 480 relative to the column. Mounting bracket 494 and clamp 540 further provide a mechanism to mount the housing or engage the housing 480 with the extendable pole 500. Housing 480 encloses a power supply 482 and integrated circuit 488. Electrical interconnects 484 provide physical interconnects between a variety of sensors and the integrated circuit. The control board or circuit 488 also has the capability to wirelessly connect sensors having wireless transmitters. Antenna 486 assists the transmission of data or information collected from the sensors from the control board 488 to a base station 120. The housing 480 further includes a hinged 490 having latches 492 wherein when the door is closed the door is sealed to the housing to prevent moisture from entering into the housing.

Extendable pole 500 includes a first section 502 and second section 504 that are coupled together via coupling 506. In the embodiment illustrated in the Figures, the first section has a diameter that is less than the inner diameter of the second section 506, thereby allowing the first section to extend in and out of the second section. Other known extendable poles of different construction may be utilized without department from the scope of the invention. An upper portion 508 of the first section 502 is fixed to arm member 520 by a clamp 528. The clamp may be loosened and the arm member 520 may be removed from the pole 500. Slots 524 and 526 formed in the arm member may be utilized to hang the arm member 520 on the support 420 when collapsing and storing the field unit 410. Alternatively, the slots 524 and 526 may be utilized to engage and support additional sensors on arm 520. Sensor 530 is positioned on the outer end of arm member 520 to avoid interference with the remote data transmit module electronics and other sensors. In use, one or more field units 410 may be positioned in a crop field. Sensors are positioned in the ground or on the support 420 and activated.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open-ended sense in that elements in addition to those enumerated may also be present. Other examples will be apparent to those of skill in the art upon reviewing this document.

What is claimed is:

1. A method for continuous real time monitoring a crop growth, the method including the steps of:
    providing field units for positioning within a boundary of a crop growth, wherein the field units are capable of coupling to accessories selected from the group consisting of soil moisture sensors, soil temp sensors, soil conductivity sensors, soil oxygen sensors, air oxygen sensors, air temperature sensors, air humidity sensors, air CO2 sensors, frost sensors, solar radiation sensors, wind sensors, precipitation sensors, digital camera, and GPS location sensors;
    linking the field units to a base station;
    transmitting and receiving data between the field units and the base station;
    obtaining data corresponding to outputs from the accessories;
    transmitting data corresponding to outputs from the accessories to the base station;
    obtaining setting preferences for at least two items selected from the group consisting of the field units, accessories, a date range, and a soil decay rate;
    generating values associated with at least one of soil saturation, soil nitrogen mineralization, and growing degree units, wherein values associated with soil saturation depend upon volumetric soil moisture measurements detected over time; and
    wherein values associated with soil nitrogen mineralization depend upon detected biological processes of soil organic matter; and wherein values associated with growing degree units depend upon transmitted data outputs, previous compiled outputs and reference data; and
    transmitting the generated values to a user within a day of obtaining data corresponding to the outputs of the accessories.

2. The method as recited in claim 1, further including the step of transmitting information to the user to allow optimization of tissue sampling tools, wherein the information transmitted is dependent upon the generated values associated with the at least one of soil saturation, soil nitrogen mineralization, and growing degree units.

3. The method as recited in claim 1, further including the step of transmitting information to the user to allow optimization of grower practices, wherein the information transmitted is dependent upon the generated values associated with the at least one of soil saturation, soil nitrogen mineralization, and growing degree units.

4. The method as recited in claim 1, further including the step of transmitting information to the user to allow irrigation optimization, wherein the information provided is dependent upon the generated values associated with the at least one of soil saturation, soil nitrogen mineralization, and growing degree units.

5. The method as recited in claim 1, further including the step of providing information concerning nitrogen mineralization predictors to the user.

6. The method as recited in claim 1, wherein the step of generating a value associated with soil saturation further depends upon values associated with field capacity and plant water extraction limit.

7. The method as recited in claim 6, further including the step of estimating available water holding capacity (AWC) dependent upon values associated with field capacity and plant water extraction limit.

8. The method as recited in claim 1, wherein the step of determining a value associated with soil nitrogen mineralization further depends upon values transmited and received data from a soil temperature sensor and a soil moisture content sensor.

9. The method as recited in claim 8, further including the step of transmitting information concerning nitrogen mineralization predictors to the user.

10. The method as recited in claim 1, further including the step of adjusting an arm member of each field unit to remain above a crop growth canopy.

11. The method as recited in claim 10, wherein the accessories are coupled to the arm member of each field unit and data is transmitted associated with at least one of ambient light, air humidity, and air temperature.

12. A method for continuous real time monitoring a crop growth, the method including the steps of:
  providing field units for positioning within a boundary of a crop growth, wherein the field units are capable of coupling to accessories selected from the group consisting of soil moisture sensors, soil temp sensors, soil conductivity sensors, soil oxygen sensors, air oxygen sensors, air temperature sensors, air humidity sensors, air CO2 sensors, frost sensors, solar radiation sensors, wind sensors, precipitation sensors, digital camera, and GPS location sensors;
  linking the field units to a base station;
  transmitting and receiving data between the field units and the base station;
  obtaining data corresponding to outputs from the accessories;
  transmitting data corresponding to outputs from the accessories to the base station;
  setting preferences for the field units and accessories;
  transmitting at least one of control commands, notifications and alarms from the base unit to applications; and
  generating values associated with at least one of soil saturation, soil nitrogen mineralization, and growing degree units, wherein values associated with soil saturation depend upon volumetric soil moisture measurements detected over time; and wherein values associated with soil nitrogen mineralization depend upon detected biological processes of soil organic matter; and wherein values associated with growing degree units depend upon transmitted data outputs, previous compiled outputs and reference data:
  adjusting at least one of irrigation, field units, and grower practices dependent upon the generated values associated with the at least one of soil saturation, soil nitrogen mineralization, and growing degree units.

13. The method as recited in claim 12, further including the step of providing information to the user to allow optimization of tissue sampling tools dependent upon values associated with at least one of soil saturation, soil nitrogen mineralization, and growing degree units.

14. The method as recited in claim 12, further including the step of transmitting information to the user to allow optimization of fertilization dependent upon generated values associated with at least one of soil saturation, soil nitrogen mineralization, and growing degree units.

15. The method as recited in claim 12, further including the step of transmitting information to the user to allow irrigation optimization dependent upon generated values associated with at least one of soil saturation, soil nitrogen mineralization, and growing degree units.

16. The method as recited in claim 12, further including the step of adjusting an arm member of each field unit to remain above a crop growth canopy.

17. The method as recited in claim 16, wherein the accessories are coupled to the field unit and data is transmitted associated with at least one of ambient light, air humidity, and air temperature.

18. A method for continuous real time monitoring a crop growth, the method including the steps of:
  providing field units for positioning within a boundary of a crop growth, wherein the field units are capable of coupling to accessories selected from the group consisting of soil moisture sensors, soil temp sensors, soil conductivity sensors, and soil oxygen sensors;
  linking the field units to a base station;
  transmitting and receiving data between the field units and the base station;
  obtaining data corresponding to outputs from the accessories;
  transmitting data corresponding to outputs from the accessories to the base station;
  obtaining setting preferences for at least two items selected from the group consisting of the field units, accessories, a date range, and a soil decay rate;
  generating values associated with field capacity wherein the values associated with field capacity depend upon volumetric soil moisture measurements detected over time; and
  transmitting the generated determined values to a user within a day of obtaining data corresponding to the outputs of the accessories.

19. The method as recited in claim 18, further including the step of generating a value associated with soil saturation that depends upon values associated with field capacity and a plant water extraction limit.

20. The method as recited in claim 18, further including the step of estimating available water holding capacity (AWC) dependent upon the generated values associated with field capacity and values generated related to plant water extraction limit.

* * * * *